(12) United States Patent  (10) Patent No.: US 11,741,591 B2
Jiang et al.  (45) Date of Patent: Aug. 29, 2023

(54) METHOD AND APPARATUS FOR DETECTING THICKNESS OF PAPER AND STORAGE MEDIUM

(71) Applicant: WEIHAI HUALING OPTO-ELECTRONICS CO., LTD., Shandong (CN)

(72) Inventors: Li Jiang, Shandong (CN); Rongxin Song, Shandong (CN); Xiumei Qi, Shandong (CN); Jie Xian, Shandong (CN)

(73) Assignee: WEIHAI HUALING OPTO-ELECTRONICS CO., LTD., Shandong (CN)

( * ) Notice: Subject to any disclaimer, the term of this patent is extended or adjusted under 35 U.S.C. 154(b) by 324 days.

(21) Appl. No.: 16/982,600

(22) PCT Filed: May 17, 2019

(86) PCT No.: PCT/CN2019/087344
§ 371 (c)(1),
(2) Date: Sep. 21, 2020

(87) PCT Pub. No.: WO2020/052263
PCT Pub. Date: Mar. 19, 2020

(65) Prior Publication Data
US 2021/0209745 A1    Jul. 8, 2021

(30) Foreign Application Priority Data
Sep. 14, 2018 (CN) .......................... 201811075178.7

(51) Int. Cl.
*G06K 9/00* (2022.01)
*G06T 7/00* (2017.01)
(Continued)

(52) U.S. Cl.
CPC ............ *G06T 7/0004* (2013.01); *G01B 11/06* (2013.01); *G06T 5/50* (2013.01); *G07D 7/164* (2013.01);
(Continued)

(58) Field of Classification Search
CPC .................... G06T 7/0004; G06T 5/50; G06T 2207/20216; G06T 2207/30124; G06T 7/60; G01B 11/06; G07D 7/164
See application file for complete search history.

(56) References Cited

U.S. PATENT DOCUMENTS

2014/0270460 A1*  9/2014  Liang .................. G06T 7/90
                                              382/135
2018/0225819 A1*  8/2018  Toskala ............... G06T 7/593

FOREIGN PATENT DOCUMENTS

AU         5723186 A      11/1986
CN       101546451 A       9/2009
(Continued)

OTHER PUBLICATIONS

Sako Hiroshi: "Technologies for developing an advanced intelligent ATM with self-defence capabilities", Algorithms and Technologies for Multispectral, Hyperspectral, and Ultraspectral Imagery XIX-Proceedings of SPIE, vol. 7534, Jan. 17, 2010, p. 75340E, XP055919197, US ISSN: 0277-786x, DOI: 10.1117/12.838724 ISBN: 978-1-5106-4548-6.

*Primary Examiner* — Andrew M Moyer
(74) *Attorney, Agent, or Firm* — Gang Yu

(57) ABSTRACT

Provided are a method and an apparatus for detecting a thickness of paper, and a storage medium. The method includes: acquiring a first thickness image of a target paper; extracting at least one first thickness feature and at least one second thickness feature from the first thickness image in the first thickness image; performing average processing on gray values of multiple pixel points in the at least one first
(Continued)

thickness feature to acquire a first gray value, and the average processing is performed on gray values of the multiple pixel points in the at least one second thickness feature to acquire a second gray value; when the first gray value is smaller than the second gray value of multiple pixel points in at least one second thickness feature, determining that a thickness of a region, corresponding to the at least one second thickness feature, on the target paper has changed.

14 Claims, 6 Drawing Sheets

(51) Int. Cl.
*G01B 11/06* (2006.01)
*G06T 5/50* (2006.01)
*G07D 7/164* (2016.01)

(52) U.S. Cl.
CPC ............... *G06T 2207/20216* (2013.01); *G06T 2207/30124* (2013.01)

(56) References Cited

FOREIGN PATENT DOCUMENTS

| | | | |
|---|---|---|---|
| CN | 106997635 | A | 8/2017 |
| CN | 107067540 | A | 8/2017 |
| CN | 107134046 | A | 9/2017 |
| CN | 107481392 | A | 12/2017 |
| CN | 107507330 | A | 12/2017 |
| CN | 107978062 | A | 5/2018 |
| CN | 108010184 | A | 5/2018 |
| CN | 108198325 | A | 6/2018 |
| CN | 109410172 | A | 3/2019 |
| WO | 2013170663 | A1 | 11/2013 |

* cited by examiner

METHOD AND APPARATUS FOR DETECTING THICKNESS OF PAPER AND STORAGE MEDIUM

CROSS-REFERENCE TO RELATED APPLICATIONS

The present application claims priority to the Chinese Patent Application No. 2018110751787, filed on Sep. 14, 2018, and named after "METHOD AND APPARATUS FOR DETECTING THICKNESS OF PAPER, STORAGE MEDIUM AND PROCESSOR", Contents of the present disclosure are incorporated by reference in entirety of the Chinese Patent Application.

TECHNICAL FIELD

The embodiments of the present disclosure relate to the field of image processing, and in particular to a method and an apparatus for detecting a thickness of paper and a storage medium.

BACKGROUND

At present, a paper being changed in thickness may be detected, and may be detected by a Digital Information System (DIS) sensor. The DIS sensor is an instrument for detecting that the paper is changed in thickness.

Presently, the DIS sensor is sensitive to at least one crease feature of the paper, i.e., it misjudges the at least one crease feature of the paper as a change on thickness information of the paper. The DIS sensor cannot distinguish the thickness information of the paper from the at least one crease feature of the paper effectively, to result in that the at least one crease feature of the paper is misjudged as the change on the thickness information of the paper, thus reducing the accuracy of detection on a thickness of the paper.

Concerning the problem of low accuracy of detection on the thickness of the paper, an effective solution hasn't been pushed forward till now.

SUMMARY

According to an embodiment of the present disclosure, a method for detecting a thickness of paper is provided. The method includes that: a first thickness image of a target paper is acquired; at least one first thickness feature and at least one second thickness feature are extracted from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold; average processing is performed on gray values of multiple pixel points in the at least one first thickness feature to acquire a first gray value, and the average processing is performed on gray values of the multiple pixel points in the at least one second thickness feature to acquire a second gray value; and when the first gray value is smaller than the second gray value of multiple pixel points in the at least one second thickness feature, it is determined that a thickness of a region, corresponding to the at least one second thickness feature, on the target paper has changed.

Optionally, when the first gray value is smaller than the second gray value of the multiple pixel points in the at least one second thickness feature, and when that the thickness of the region, corresponding to the at least one second thickness feature, on the target paper has changed is determined, the method further includes that: it is determined that a region, corresponding to the at least one first thickness feature, on the target paper has at least one crease feature or a random noise.

Optionally, after that the region, corresponding to the at least one first thickness feature, on the target paper is determined to have the crease feature or the random noise, the method further includes that: the gray values of the multiple pixel points in the at least one first thickness feature are restored respectively into a target gray value of the target paper, wherein after the gray values of the multiple pixel points in the at least one first thickness feature is restored respectively into the target gray value of the target paper, the region corresponding to the at least one first thickness feature is unchanged in thickness, and does not have the at least one crease feature or the random noise; and a second thickness image of the target paper after the first gray value is restored into the target gray value is acquired, wherein the second thickness image is used for indicating that the thickness of the region, corresponding to the at least one second thickness feature, on the target paper is changed in thickness.

Optionally, a second target threshold is used for determining that the first gray value is smaller than the second gray value.

Optionally, that the thickness of the region, corresponding to the at least one second thickness feature, on the target paper is determined to change includes that: it is determined that the region, corresponding to the at least one second thickness feature, on the target paper is attached with a foreign object that makes the target paper be changed in thickness.

According to another aspect of the present disclosure, an apparatus for detecting a thickness of paper is provided. The apparatus included at least one processor, and at least one memory for storing at least one program element, wherein the at least one program element is executed by the at least one processor, the at least one program element includes: an acquisition component, configured to acquire a first thickness image of a target paper; an extraction component, configured to extract at least one first thickness feature and at least one second thickness feature from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold; a processing component, configured to perform average processing on gray values of multiple pixel points in the at least one first thickness feature to acquire a first gray value and to perform the average processing on gray values of a plurality of pixel points in the at least one second thickness feature to acquire a second gray value; and a first determination component, configured to determine, when the first gray value is smaller than a second gray value of multiple pixel points in the at least one second thickness feature, that a thickness of a region, corresponding to the at least one second thickness feature, on the target paper has changed.

Optionally, the apparatus further includes: a second determination component, configured to determine, when the first gray value is smaller than the second gray value of the multiple pixel points in the at least one second thickness feature, and when determining that the thickness of the region, corresponding to the at least one second thickness feature, on the target paper has changed, that a region, corresponding to the at least one first thickness feature, on the target paper has at least one crease feature or a random noise.

According to another aspect of the present disclosure, a non-transitory storage medium is further provided. The storage medium stores a computer program, on which at least one computer program is stored, the at least one computer program being executed by a processor to implement the following steps: a first thickness image of a target paper is acquired; at least one first thickness feature and at least one second thickness feature are extracted from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold; average processing is performed on gray values of multiple pixel points in the at least one first thickness feature to acquire a first gray value, and the average processing is performed on gray values of the multiple pixel points in the at least one second thickness feature to acquire a second gray value; and when the first gray value is smaller than the second gray value of multiple pixel points in the at least one second thickness feature, it is determined that a thickness of a region, corresponding to the at least one second thickness feature, on the target paper has changed.

According to another aspect of the present disclosure, a processor is further provided. The processor is configured to run a program; and the program runs to execute at least one executable instruction, and the at least one executable instruction includes: a first thickness image of a target paper is acquired; at least one first thickness feature and at least one second thickness feature are extracted from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold; average processing is performed on gray values of multiple pixel points in the at least one first thickness feature to acquire a first gray value, and the average processing is performed on gray values of the multiple pixel points in the at least one second thickness feature to acquire a second gray value; and when the first gray value is smaller than the second gray value of multiple pixel points in the at least one second thickness feature, it is determined that a thickness of a region, corresponding to the at least one second thickness feature, on the target paper has changed.

DETAILED DESCRIPTION OF THE EMBODIMENTS

It should be noted that the embodiments of the present disclosure and features of the embodiments may be combined with each other when there is no conflict. The present disclosure is described below in detail with reference to the accompanying drawings and in combination with the embodiments.

To make a person skilled in the art to better understand the methods in the embodiments of the present disclosure, the following clearly and completely describes the technical solutions in the embodiments of the present disclosure in combination with the accompanying drawings in the embodiments of the present disclosure. Apparently, the described embodiments are a part rather than all of the embodiments of the present disclosure. All other embodiments obtained by a person skilled in the art based on the embodiments of the present disclosure without creative efforts shall fall within the protection scope of the present disclosure.

It should be noted that, terminologies such as "first" and "second" in the specification, claims and accompanying drawings of the present disclosure are only used for distinguishing similar objects, rather than to describe a special order or a precedence order. It should be understood that data used in such a way may be interchangeable in a certain cases, such that the embodiments of the present disclosure described here can be implemented. In addition, the terms "comprise," "comprising," "include," "including," "has," "having" or any other variation thereof, are intended to cover a non-exclusive inclusion. For example, a process, a method, a system, a product or a device that includes a list of steps or elements is not necessarily limited to only those steps or elements but may include other steps or elements not expressly listed or inherent to such a process, a method, a product or a device.

The embodiments of the present disclosure provide a method for detecting a thickness of paper.

Figure 1:
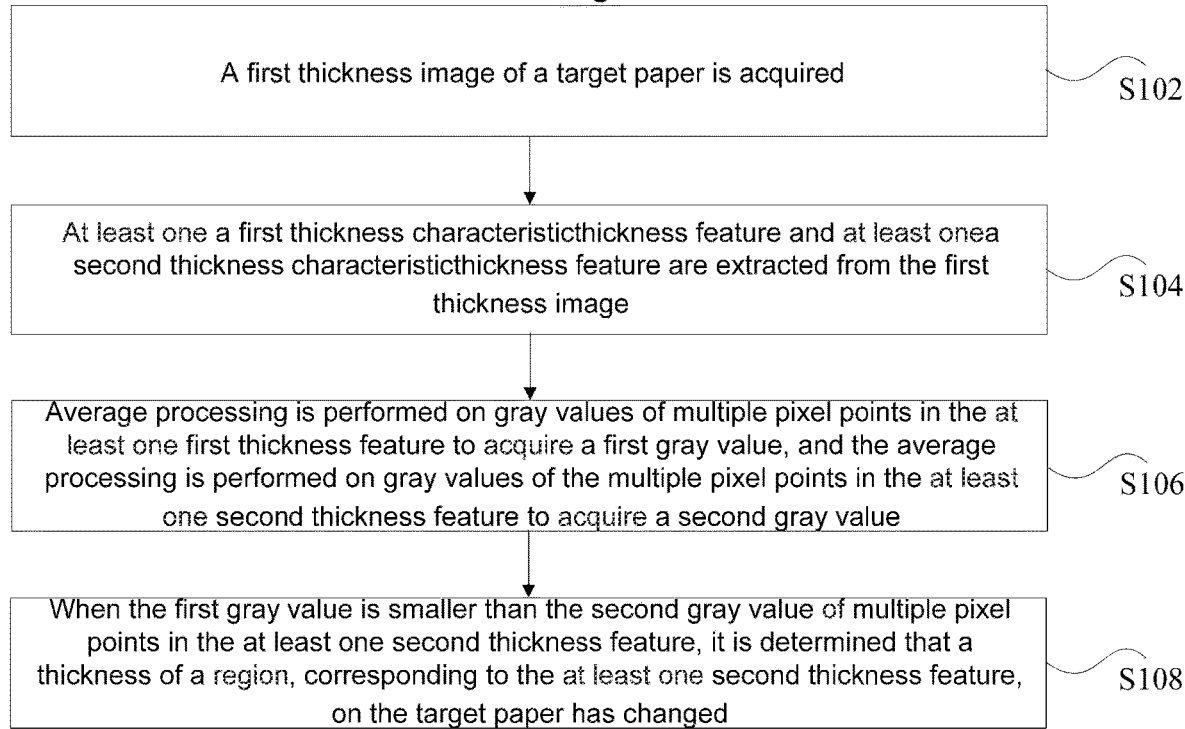
FIG. 1 is a flowchart of a method for detecting a thickness of paper according to an embodiment of the present disclosure.

FIG. 1 is a flowchart of a method for detecting a thickness of paper according to an embodiment of the present disclosure. As shown in FIG. 1, the method includes the following steps.

At S102, a first thickness image of a target paper is acquired.

In the above technical solution provided by step S102 of the present disclosure, the target paper may be a paper in need of thickness detection such as a paper currency, a cash remittance, a bill of payment, and is not limited herein. The first thickness image of the target paper is acquired. The first thickness image that is also referred to as a first thickness information image may be an original thickness information image of the target paper, and includes at least one thickness feature of the target paper.

At S104, at least one first thickness feature and at least one second thickness feature are extracted from the first thickness image.

In the above technical solution provided by step S104 of the present disclosure, after the first thickness image of the target paper is acquired, the at least one first thickness feature and the at least one second thickness feature are extracted from the first thickness image.

In the embodiment, the acquired first thickness image of the target paper may be classified into the at least one first thickness feature and the at least one second thickness feature according to a size of a region for thickness feature information included in the first thickness image. Each of the at least one first thickness feature has a number of pixel points in the first thickness image is smaller than or equal to a first target threshold, and the at least one first thickness feature may be at least one fine thickness feature in the first thickness image, for example, at least one crease on the target paper, or a random noise, etc. Each of the at least one second thickness feature has a number of pixel points in the first thickness image is greater than the first target threshold, and the at least one second thickness feature may be at least one outsize remarkable thickness feature in the first thickness image, for example, the at least one outsize remarkable thickness feature is at least one attached object on the target paper. The at least one attached object may be at least one foreign object such as at least one adhesive tape.

In the embodiment, the first target threshold may be a critical number of pixel points for distinguishing the at least one first thickness feature and the at least one second thickness feature of the target paper on the first thickness image, and may be an empirical value. For example, when the at least one first thickness feature occurs due to at least one crease of the target paper, and the at least one second thickness feature occurs due to at least one adhesive tape attached on the target paper, the first target threshold may be a number of pixel points for distinguishing the at least one crease and the at least one adhesive tape of the target paper on the first thickness image, and may be the empirical value of 2 pixel points. The at least one crease has smaller than or equal to 2 pixel points in the first thickness image, and the adhesive tape has greater than 2 pixel points in the first thickness image.

At S106, average processing is performed on gray values of multiple pixel points in the at least one first thickness feature to acquire a first gray value, and the average processing is performed on gray values of the multiple pixel points in the at least one second thickness feature to acquire a second gray value.

In the above technical solution provided by step S106 of the present disclosure, when the average processing is not performed on the gray values of the multiple pixel points in the at least one first thickness feature, the gray values of the multiple pixel points in the first thickness feature are the same as gray values of multiple pixel points in the second at least one thickness feature, and thus it is difficult to distinguished effectively whether a thickness of a region, corresponding to the first thickness feature, on the target paper and a thickness of a region, corresponding to the second thickness feature, on the target paper change.

Therefore, after the at least one first thickness feature and the at least one second thickness feature are extracted from the first thickness image in the embodiment, the average processing is performed on the gray values of the multiple pixel points in the at least one first thickness feature to acquire the first gray value. That is to say, a number of the multiple pixel points in the at least one first thickness feature may be taken as more as possible, so that the first gray value acquired by performing the average processing on the gray values of the multiple pixel points in the at least one first thickness feature is as small as possible.

Optionally, in the embodiment, the average processing is not performed on the gray values of the multiple pixel points in the at least one second thickness feature, that is to say, original gray values of the multiple pixel points in the at least one second thickness feature are kept. In this way, it may be assured that an original gray feature value in at least one the second thickness feature and a region covered by at least one attached object are unchanged, thus a thickness of the at least one attached object on the target paper as well as an attached region on the target paper are accurately identified.

At S108, when the first gray value is smaller than the second gray value of multiple pixel points in the at least one second thickness feature, it is determined that a thickness of a region, corresponding to the at least one second thickness feature, on the target paper has changed.

In the above technical solution provided by step S108 of the present disclosure, after the average processing is performed on the gray values of the multiple pixel points in the at least one first thickness feature to acquire the first gray value, the first gray value is smaller than the second gray value of the multiple pixel points in the at least one second thickness feature. A second target threshold may be set; when the second gray value is greater than the second target threshold and the first gray value is smaller than the second target threshold, it is determined that the thickness of the region, corresponding to the at least one second thickness feature, on the target paper has changed; and a thickness of a region corresponding to the first thickness feature is not detected. Therefore, the region corresponding to the first thickness feature is prevented from being misjudged as a change of the thickness, whether the thickness of the target paper has changed is identified effectively and the accuracy of detection on the target paper is improved.

By means of step S102 to step S108 above, the first thickness image of the target paper is acquired; the at least one first thickness feature and the at least one second thickness feature are extracted from the first thickness image, wherein the number of pixel points of each of the at least one first thickness feature in the first thickness image is smaller than or equal to the first target threshold, and the number of pixel points of each of the at least one second thickness feature in the first thickness image is greater than the first target threshold; the average processing is performed on the gray values of the multiple pixel points in the at least one first thickness feature to acquire the first gray value; and when the first gray value is smaller than the second gray value of the multiple pixel points in the at least one second thickness feature, it is determined that the thickness of the region, corresponding to the at least one second thickness feature, on the target paper has changed. The at least one first thickness feature and the at least one second thickness feature are extracted from the thickness image of the target paper, and when the first gray value after the gray values of the multiple pixel points in the at least one first thickness feature are averaged is smaller than the gray values for the pixel points in the at least one second thickness feature, it is determined that the thickness of the region, corresponding to the second thickness feature, on the target paper has changed, so that the region corresponding to the first thickness feature is prevented from being misjudged as a change of the thickness, the change of the thickness of the paper is effectively detected, the problem of low accuracy of the detection on the thickness of the paper is solved, and the accurate effect of the detection on the thickness of the paper is achieved.

As an optional implementation method, in step S108, when the first gray value is smaller than the second gray value of the multiple pixel points in the at least one second thickness feature, and when that the thickness of the region, corresponding to the second thickness feature, on the target paper has changed is determined, it is determined that a region, corresponding to the at least one first thickness feature, on the target paper has at least one crease feature or a random noise.

In the embodiment, when the first gray value is smaller than the second gray value of the multiple pixel points in the at least one second thickness feature, for example, when the second gray value is greater than the second target threshold, and the first gray value is smaller than the second target threshold, and when it is determined that the thickness of the region, corresponding to the at least one second thickness feature, on the target paper has changed, it may be determined from another aspect that the region, corresponding to the at least one first thickness feature, on the target paper has interference information for the detection of the thickness of the target paper. The interference information may be the at least one crease feature, or the random noise. Therefore, that the thickness of the region, corresponding to the first thickness feature, on the target paper has changed is effectively distinguished, and the region, corresponding to the at least one second thickness feature, on the target paper only has the interference information, but the thickness of the target paper is not affected, and the accuracy of detection on the thickness of the target paper is improved.

Optionally, in the embodiment, with more-taking average processing on the at least one crease feature or the random noise on the target paper, the interference caused by the at least one crease feature or the random noise when it is determined whether the target paper has the at least one attached object that makes the thickness information change may be eliminated.

As an optional implementation method, after the region, corresponding to the first thickness feature, on the target paper is determined to have the at least one crease feature or the random noise, the gray values of the multiple pixel points in the at least one first thickness feature is restored respectively into a target gray value of the target paper, wherein after the gray values of the multiple pixel points in the at least one first thickness feature is restored respectively into the target gray value of the target paper, the region corresponding to the at least one first thickness feature is unchanged in thickness, and does not have the at least one crease feature or the random noise; and a second thickness image of the target paper after the first gray value is restored into the target gray value is acquired, wherein the second thickness image is used for indicating that the first region, corresponding to the at least one second thickness feature, on the target paper is changed in thickness.

In the embodiment, the at least one first thickness feature smaller than the second target threshold is caused by the at least one crease feature or the random noise. After that the region, corresponding to the first thickness feature, on the target paper has the at least one crease feature or the random noise is determined, the at least one first thickness feature smaller than the second target threshold is eliminated. The gray values of the multiple pixel points in the at least one first thickness feature may be restored respectively into the target gray value of the target paper, for example, the target gray value may be a gray value of a region without any attached object on the target paper, so that an original region corresponding to the at least one first thickness feature is unchanged in thickness, and does not have the at least one crease feature or the random noise. After the first gray value is restored into the target gray value, the target paper is regenerated into the second thickness image, that is to say, the target paper is regenerated into a thickness information image of the target paper without the at least one crease or the noise. The second thickness image may accurately show a region where the thickness has changed on the target paper, that is to say, it may be accurately determined that the thickness of the region, corresponding to the second thickness feature, on the target paper has changed by the second thickness image. Therefore, the interference caused by the at least one crease feature or the random noise when it is determined whether the target paper has at least one attached object that makes the thickness information change is eliminated, whether the target paper is attached with at least one foreign matter is accurately identified, and the accuracy of detection on the thickness of the target paper is improved.

As an optional implementation method, a second target threshold is used for determining that the first gray value is smaller than the second gray value.

In the embodiment, after the average processing is performed on the gray values of the multiple pixel points in the at least one first thickness feature to acquire the first gray value, when that the first gray value is smaller than the second target threshold is determined, it is determined that the region, corresponding to the first thickness feature, on the target paper has the at least one crease or the random noise; and when that the second gray value is greater than the second target threshold is determined, it is determined that the thickness of the region, corresponding to the second thickness feature, on the target paper has changed.

For example, the more-taking average processing is performed on the gray values of the multiple pixel points in the at least one first thickness feature to acquire a first average value 120 that is smaller than second target threshold 170, and the gray values of the multiple pixel points in the at least one second thickness feature is 200 that is greater than the second target threshold 170; and thus, it is determined that the thickness of the region, corresponding to the second thickness feature, on the target paper has changed.

As an optional implementation method, in step S106, when the average processing is performed on the gray values of the multiple pixel points in the at least one first thickness feature to acquire the first gray value, the average processing is performed on gray values of multiple pixel points in the second thickness feature to acquire the second gray value.

In the embodiment, when the average processing is performed on the gray values of the multiple pixel points in the at least one first thickness feature to acquire the first gray value, the average processing may be performed on the gray values of the multiple pixel points in the at least one second thickness feature, for example, less-taking average processing is performed on the gray values of the multiple pixel points in the at least one second thickness feature, that is to say, the number of the multiple pixel points in the at least one second thickness feature may be taken as less as possible, so as to a second gray feature acquired by performing the average processing on the gray values of the multiple pixel points in the at least one second thickness feature is as large as possible.

As an optional implementation method, in step S108, that the thickness of the region, corresponding to the second thickness feature, on the target paper has changed is determined includes that: it is determined that the region, corresponding to the at least one second thickness feature, on the target paper is attached with at least one foreign object that makes the target paper be changed in thickness.

In the embodiment, when the first gray value is smaller than the second gray value of the multiple pixel points in the at least one second thickness feature, it is determined that the thickness of the region, corresponding to the second thickness feature, on the target paper has changed. It may be determined that the region, corresponding to the second thickness feature, on the target paper is attached with the at least one foreign object that makes the target paper be changed in thickness. The at least one foreign object may be at least one adhesive tape, and is not limited herein.

The method for detecting the thickness of the target paper may be executed by a a Digital Information System (DIS) sensor in the embodiment. The first thickness image of the target paper is extracted, and distinguished into the at least one first thickness feature and the at least one second thickness feature according to the size of thickness feature information region included in the at least one first thickness image; and with the more-taking average processing on the gray values of the multiple pixel points in the at least one first thickness feature to acquire the first gray value, it may be determined that the gray value (second gray value) of the multiple pixel points in the second thickness feature is greater than the first gray value by the second target threshold. When the second gray value is greater than the second target threshold, it is determined that the region, corresponding to the second thickness feature, on the target paper has at least one attached object. When the first gray value is smaller than the second target threshold, the region, corresponding to the first thickness feature, on the target paper is not detected. Therefore, the region corresponding to the first thickness feature is prevented from being misjudged as a change of the thickness, whether the thickness of the target paper has changed is identified effectively and the accuracy of detection on the target paper is improved.

The technical solutions of the present disclosure are illustrated below in combination with preferred implementation methods. Specifically, the target paper is a paper currency for example.

Figure 2:
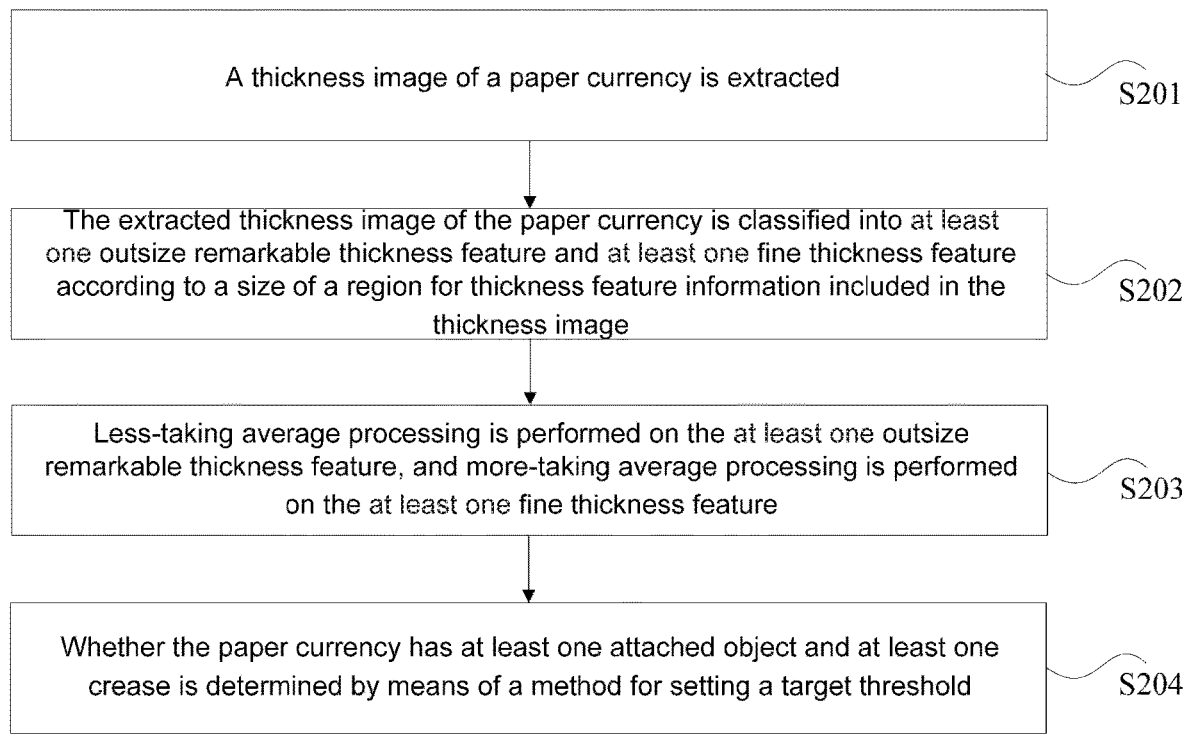
FIG. 2 is a flowchart of a method for processing a crease in a Digital Information System (DIS) scanning image according to an embodiment of the present disclosure.

FIG. 2 is a flowchart of a method for processing a crease in a DIS scanning image according to an embodiment of the present disclosure. As shown in FIG. 2, the method includes the following steps.

At S201, a thickness image of a paper currency is extracted.

At S202, the extracted thickness image of the paper currency is classified into at least one outsize remarkable thickness feature and at least one fine thickness feature according to a size of a region for thickness feature information included in the thickness image.

In the embodiment, after the thickness image of the paper currency is extracted, the thickness feature information may be classified into the at least one outsize remarkable thickness feature and the at least one fine thickness feature according to the number of pixel points included in the region for thickness feature information.

At S203, less-taking average processing is performed on the at least one outsize remarkable thickness feature, and more-taking average processing is performed on the at least one fine thickness feature.

After the extracted thickness image is classified into the at least one outsize remarkable thickness feature and the at least one fine thickness feature according to the size of the region for the thickness feature information included in the thickness image, the less-taking average processing is performed on the at least one outsize remarkable thickness feature, that is to say, a number of the multiple pixel points in the at least one outsize remarkable thickness feature may be taken as less as possible, so as to an average gray value acquired by performing the average processing on gray values of the multiple pixel points in the at least one outsize remarkable thickness feature is as large as possible. The more-taking average processing is performed on the fine thickness feature, that is to say, a number of multiple pixel points in the fine thickness feature may be taken as more as possible, so as to an average gray value acquired by performing the average processing on gray values of the multiple pixel points in the at least one fine thickness feature is as small as possible.

At S204, whether the paper currency has at least one attached object and at least one crease is determined by means of a method for setting a target threshold.

After the less-taking average processing is performed on the at least one outsize remarkable thickness feature, and the more-taking average processing is performed on the at least one fine thickness feature, when gray values acquired by performing the less-taking average processing on the at least one outsize remarkable thickness feature is greater than the target threshold, a region, corresponding to the at least one outsize remarkable thickness feature, on the paper currency is determined as being provided with at least one attached object. The at least one attached object may be at least one adhesive tape, and is not limited herein. When gray values acquired by performing the more-taking average processing on the at least one fine thickness feature is smaller than the target threshold, a region, corresponding to the fine thickness feature, on the paper currency is determined as the at least one crease and is not detected. Therefore, the at least one attached object and the at least one crease region are distinguished, and whether thickness information of the paper currency has changed, for example, whether the paper currency is attached with at least one foreign object such as at least one adhesive tape, is effectively identified.

Optionally, for gray values of multiple pixel points in the at least one outsize remarkable thickness feature in step S203 of the embodiment, an average value may be not taken, that is to say, original gray values of the multiple pixel points in the outsize remarkable thickness feature are kept, so that it is assured that an original gray feature value of the at least one attached object and a region covered by the at least one attached object are unchanged and thus a thickness of the at least one attached object and an attached region on the paper currency may be accurately identified. For gray values of multiple pixel points in the at least one fine thickness feature, more-taking average processing is performed on the at least one fine thickness feature, and a gray value corresponding to the at least one crease on the thickness image after the average value is taken is smaller than a gray value corresponding to the at least one attached object.

Optionally, in step S204, the at least one fine thickness feature corresponding to the average gray value that is smaller than the target threshold is determined as the at least one crease feature, and fine thickness feature is eliminated, and the gray values is restored respectively into a gray value of the paper currency in the region without at least one adhesive tape; and thus, the paper currency of which the gray value is restored into the gray value of the paper currency in the region without the at least one adhesive tape, regenerates a thickness information image of the paper currency, where the at least one crease is eliminated, and whether the paper currency is provided with the at least one attached object is identified accurately.

Optionally, in the embodiment, after the more-taking average value processing on the at least one crease feature or the random noise of the paper currency, interference caused by the at least one crease feature or the random noise when it is determined whether the target paper has the at least one attached object that makes thickness information change may be eliminated.

In the embodiment, the thickness image of the paper currency is extracted, and distinguished into the at least one outsize remarkable thickness feature and the at least one fine thickness feature according to the size of a region for thickness feature information included in the thickness image of the paper currency, the less-taking average processing is performed on the outsize remarkable thickness feature, and the more-taking average processing is performed on the fine thickness feature. After the average processing, average gray value corresponding to the at least one outsize remarkable thickness feature on the paper currency is greater than average gray value corresponding to the at least one fine thickness feature on the paper currency; and then, by means of a threshold determination method, the at least one outsize remarkable thickness feature corresponding to the average gray value greater than the target threshold is caused by the at least one attached object on the paper currency, the at least one fine thickness feature corresponding to the average gray value smaller than the target threshold is caused by the at least one crease on the paper currency is not detected, and thus the at least one attached object and the at least one crease on the paper currency are distinguished effectively.

Figure 3:
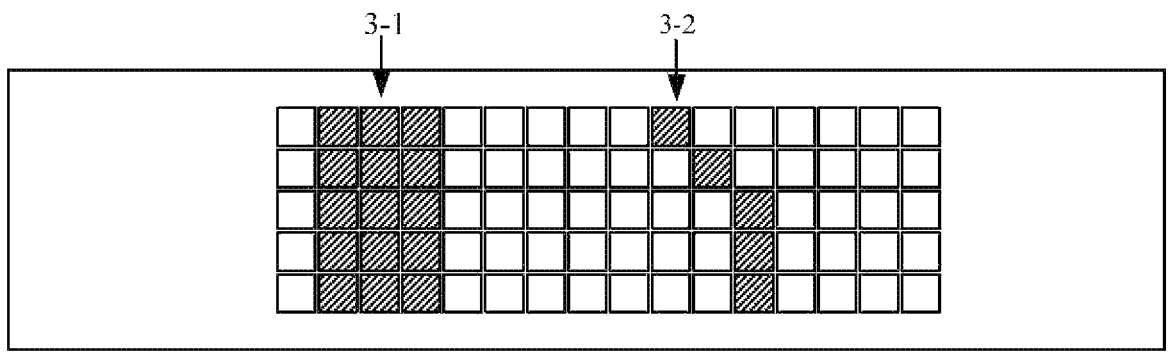
FIG. 3 is a schematic diagram of an original thickness image of a paper currency according to an embodiment of the present disclosure.

FIG. 3 is a schematic diagram of an original thickness image of a paper currency according to an embodiment of the present disclosure. As shown in FIG. 3, 3-1 is used for denoting gray features of an adhesive tape region, which is not taken average value, and the 3-2 is used for denoting gray features of a crease region, which is not taken average value.

It should be noted that a shaded region shown in FIG. 3 is merely for distinguishing the gray features of the adhesive tape region, which is not taken average value, and the gray features of the crease region, which is not taken average value, from features of other regions of the paper currency.

Figure 4:
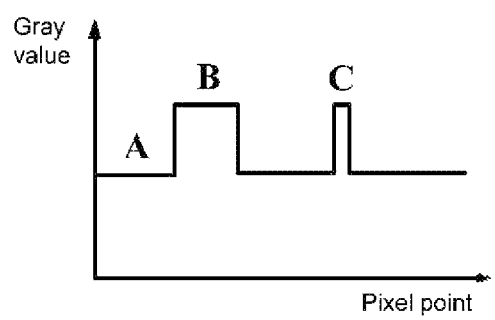
FIG. 4 is a schematic diagram of a gray value curve of an original thickness image of a paper currency according to an embodiment of the present disclosure.

FIG. 4 is a schematic diagram of a gray value curve of an original thickness image of a paper currency according to an embodiment of the present disclosure. As shown in FIG. 4, "A" gray value is used for denoting a gray value of the paper currency without at least one adhesive tape and at least one crease, "B" gray value is used for denoting a gray value of an adhesive tape region on the paper currency, and "C" gray value is used for denoting a gray value of a crease region on the paper currency. As can be seen from FIG. 4, the adhesive tape region and the crease region have the same gray value, and the adhesive tape region and the crease region on the paper currency cannot be distinguished, so as to crease is misjudged as change of thickness information of the paper currency.

Figure 5:
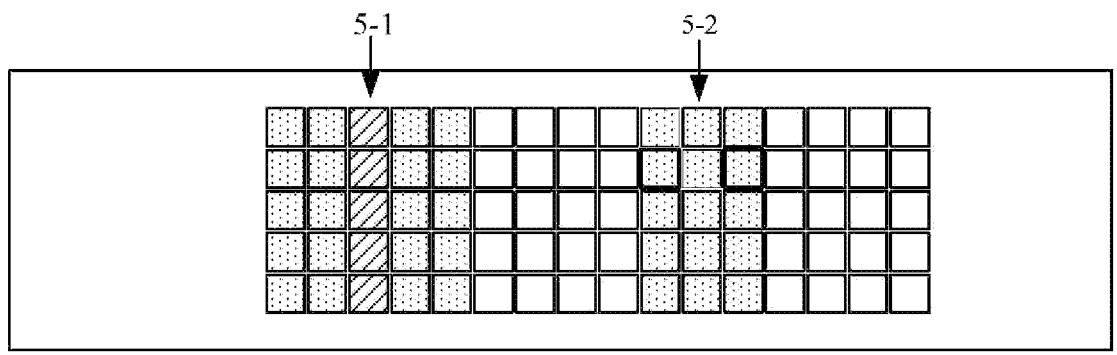
FIG. 5 is a schematic diagram of a gray level of a thickness image of a paper currency after average value taking processing according to an embodiment of the present disclosure.

FIG. 5 is a schematic diagram of a gray level of a thickness image of a paper currency after average value taking processing according to an embodiment of the present disclosure. As shown in FIG. 5, 5-1 is used for denoting gray features of an adhesive tape region after less-taking average processing, and the 5-2 is used for denoting gray features of a crease after more-taking average processing.

It should be noted that a shaded region shown in FIG. 5 is merely for distinguishing the gray features of the adhesive tape region after the less-taking average processing and the gray features of the crease after the more-taking average processing from characteristics of other regions of the paper currency.

Figure 6:
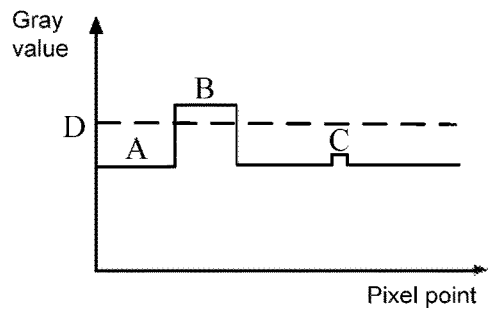
FIG. 6 is a schematic diagram of a gray value curve of a thickness image of a paper currency after average value taking processing according to an embodiment of the present disclosure.

FIG. 6 is a schematic diagram of a gray value curve of a thickness image of a paper currency after average value taking processing according to an embodiment of the present disclosure. As shown in FIG. 6, "A" gray value is used for denoting a gray value of the paper currency without at least one adhesive tape and at least one crease, "B" gray value is used for denoting a gray value of a adhesive tape region after the less-taking average processing, "C" gray value is used for denoting a gray value of the at least one crease after the more-taking average processing, and the "D" gray value is used for denoting a threshold; the gray value of the adhesive tape region is greater than that of the crease region. By means of the method for setting the threshold "D", a region having the gray value greater than the threshold "D" is determined as the adhesive tape region, and a region having the gray value smaller than the threshold "D" is not detected; and thus, the paper currency and the at least one crease are effectively distinguished.

Figure 7:
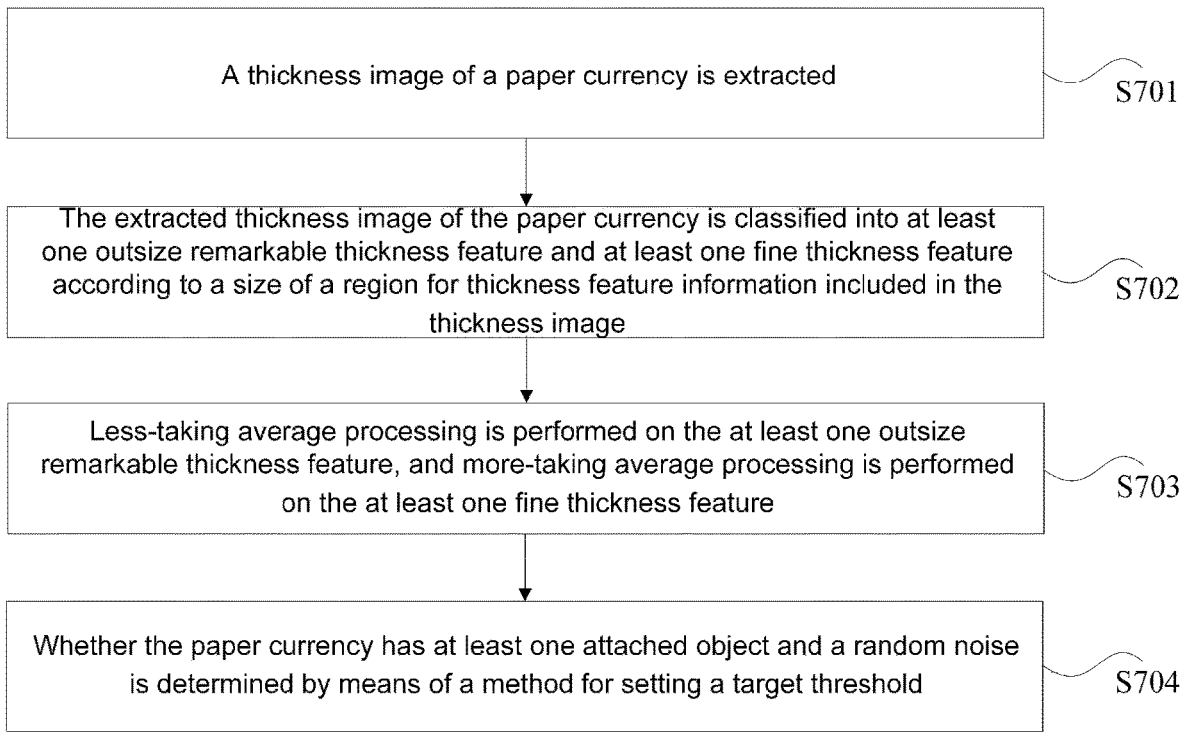
FIG. 7 is a flowchart of a method for processing a crease in another DIS scanning image according to an embodiment of the present disclosure.

FIG. 7 is a flowchart of a method for processing a crease in another DIS scanning image according to an embodiment of the present disclosure. As shown in FIG. 7, the method includes the following steps.

At S701, a thickness image of a paper currency is extracted.

At S702, the extracted thickness image of the paper currency is classified into at least one outsize remarkable thickness feature and at least one fine thickness feature according to a size of a region for thickness feature information included in the thickness image.

After the thickness image of the paper currency is extracted, the extracted thickness image of the paper currency is classified into the at least one outsize remarkable thickness feature and the at least one fine thickness feature according to the size of the region for the thickness feature thickness feature information included in the thickness image.

At S703, less-taking average processing is performed on the at least one outsize remarkable thickness feature, and more-taking average processing is performed on the at least one fine thickness feature.

After the thickness image is classified into the at least one outsize remarkable thickness feature and the at least one fine thickness feature according to the size of the region for the thickness feature thickness feature information included in the thickness image, the less-taking average processing is performed on the at least one outsize remarkable characteristic, and the more-taking average processing is performed on the at least one fine thickness feature.

At S704, whether the paper currency has at least one attached object and a random noise is determined by means of a method for setting a target threshold.

After the less-taking average processing is performed on the at least one outsize remarkable characteristic, and the more-taking average processing is performed on the at least one fine thickness feature, whether the paper currency has the at least one attached object and the random noise is determined by means of the method for setting the target threshold.

In the embodiment, when the gray value acquired by performing the less-taking average processing on the at least one outsize remarkable thickness feature is greater than the target threshold, the region corresponding to the at least one outsize remarkable thickness feature on the paper currency is determined as being provided with the at least one attached object. The at least one attached object may be at least one adhesive tape, and is not limited herein. When the gray value acquired by performing the more-taking average processing on the at least one fine thickness feature is smaller than the target threshold, the region corresponding to the at least one fine thickness feature on the paper is determined as the random noise and is not detected. Therefore, the at least one attached object and the random noise are distinguished, and whether the thickness information of the paper currency has changed is effectively identified.

In the embodiment, the thickness image of the paper currency is extracted, and distinguished into the at least one outsize remarkable characteristic and the at least one fine thickness feature according to the size of the region for the thickness feature thickness feature information included in the thickness image, the less-taking average processing is performed on the at least one outsize remarkable characteristic, and the more-taking average processing is performed on the at least one fine thickness feature. After the average processing, the average gray value corresponding to the at least one outsize remarkable thickness feature on the paper currency is greater than the average gray value corresponding to the at least one fine thickness feature on the paper currency; and then, by means of a threshold determination method, the at least one outsize remarkable thickness feature corresponding to the average gray value greater than the target threshold is caused by the at least one attached object on the paper currency, the at least one fine thickness feature corresponding to the average gray value smaller than the target threshold is caused by the random noise on the paper currency and is not detected, and thus the at least one attached object and the random noise on the paper currency are distinguished effectively.

Figure 8:
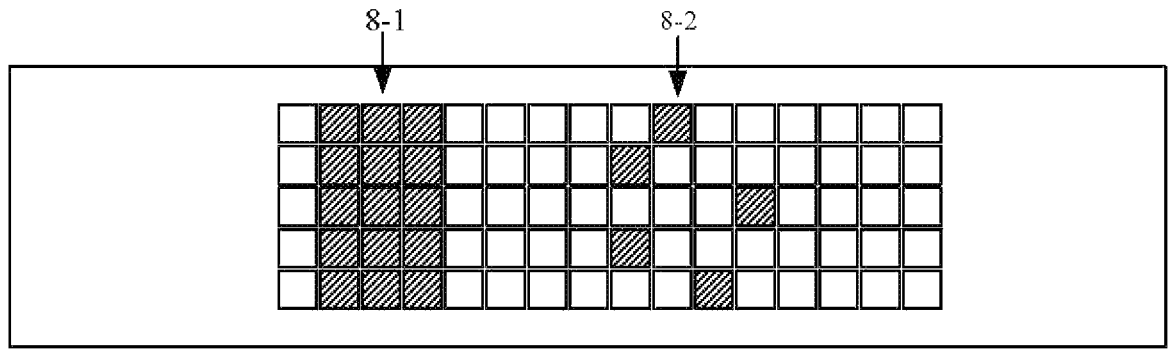
FIG. 8 is a schematic diagram of an original thickness image of another paper currency according to an embodiment of the present disclosure.

FIG. 8 is a schematic diagram of an original thickness image of another paper currency according to an embodiment of the present disclosure. As shown in FIG. 8, the 8-1 is used for denoting gray features of an adhesive tape region, and the average value of the gray features is not taken, and the 8-2 is used for denoting the gray features of a region where the random noise is located, and the average value of the gray features is not taken.

It should be noted that a shaded region shown in FIG. 8 is merely for distinguishing gray features of the adhesive tape region where the average value is not taken and features of the region where the random noise is located from features of other regions of the paper currency.

Figure 9:
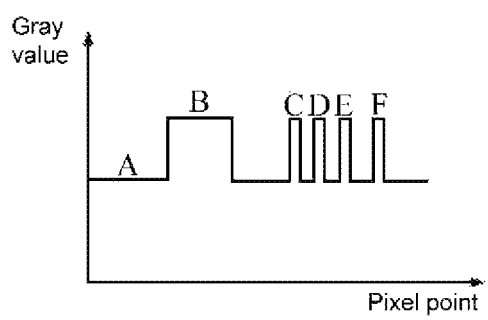
FIG. 9 is a schematic diagram of a gray value curve of an original thickness image of another paper currency according to an embodiment of the present disclosure.

FIG. 9 is a schematic diagram of a gray value curve of an original thickness image of another paper currency according to an embodiment of the present disclosure. As shown in FIG. 9, "A" gray value is used for denoting a gray value of the paper currency without the adhesive tape region and the random noise region, "B" gray value is used for denoting a gray value of an adhesive tape region, and "C" gray value, "D" gray value, "E" gray value and "F" gray value is used for denoting a gray value of a region where the random noise is located. The adhesive tape region and the region where the random noise is located have the same gray value, so that when whether thickness information of the paper currency has changed is detected, the random noise has interference to detection of the thickness information of the adhesive tape to result in that the DIS cannot accurately determine whether the thickness information of the paper currency has changed.

Figure 10:
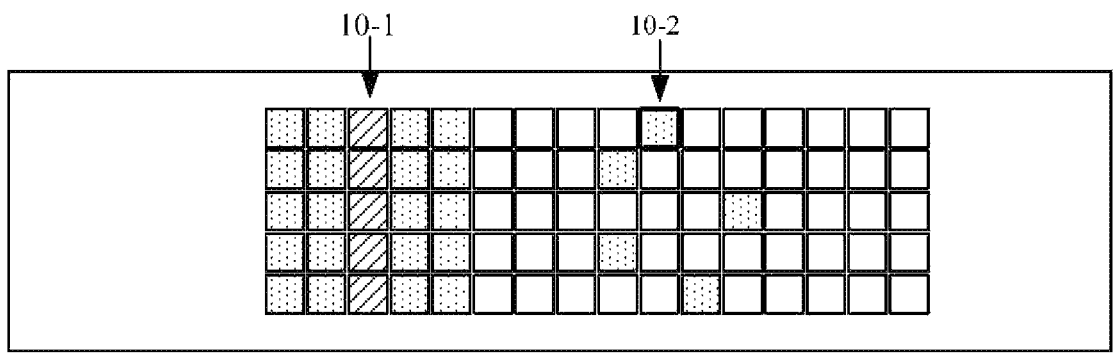
FIG. 10 is a schematic diagram of a gray value curve of a thickness image of a paper currency after another average value taking processing according to an embodiment of the present disclosure.

FIG. 10 is a schematic diagram of a gray value curve of a thickness image of a paper currency after another average value taking processing according to an embodiment of the present disclosure. As shown in FIG. 10, the 10-1 is used for denoting gray features of an adhesive tape region subjected to the less-taking average processing, and the 10-2 is used for denoting gray features of a region where the random noise is located after the more-taking average processing.

It should be noted that a shaded region shown in FIG. 10 is merely for distinguishing the gray feature of the adhesive tape region after the less-taking average processing and the gray feature of the region where the random noise is located after the more-taking average processing from characteristics of other regions of the paper currency.

Figure 11:
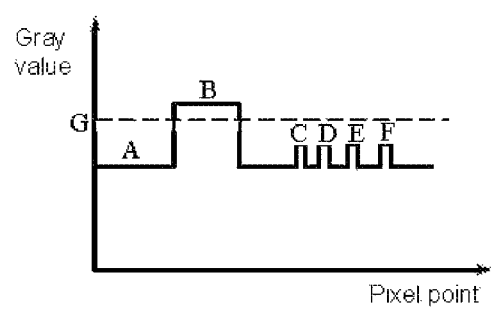
FIG. 11 is a schematic diagram of a gray value curve of a thickness image of a paper currency after another average value taking processing according to an embodiment of the present disclosure.

FIG. 11 is a schematic diagram of a gray value curve of a thickness image of a paper currency after another average value taking processing according to an embodiment of the present disclosure. As shown in FIG. 11, "A" gray value is used for denoting a gray value of the paper currency without an adhesive tape region and a crease region, "B" gray value is used for denoting a gray value of the adhesive tape region after the less-taking average processing, "C" gray value, "D" gray value, "E" gray value and "F" gray value are used for denoting a gray value of a region where the random noise is located after the more-taking average processing, and "G" gray value is used for denoting a threshold. Gray values of the adhesive tape region is greater than that of the region where the random noise is located. By means of the method for setting the threshold, a region having the gray value greater than the threshold "G" is determined as the adhesive tape region, and a region having the gray value smaller than the threshold "D" is not detected; and thus, the paper currency and the random noise are effectively distinguished, interference of the random noise to the thickness information of the adhesive tape and the like is prevented, and accuracy of detection on the thickness of the paper currency is improved.

In the embodiment, original thickness image of the paper currency is extracted, and distinguished into the at least one outsize remarkable characteristic and the at least one fine thickness feature according to the size of the region for thickness feature information included in the original thickness image, the less-taking average processing is performed on the gray values of the multiple pixel points in the at least one outsize remarkable thickness feature, and the more-taking average processing is performed on the gray values of the multiple pixel points in the at least one fine thickness feature. By determining the target threshold, when the average value acquired by performing the less-taking average processing on the gray values of the multiple pixel points in the at least one outsize remarkable thickness feature is greater than the target threshold, it may be determined that the region corresponding to the at least one outsize remarkable thickness feature on the paper currency has the at least one attached object; and when the average value acquired by performing the more-taking average processing on the gray values of the multiple pixel points in the at least one fine thickness feature is smaller than the target threshold, the region corresponding to the at least one fine thickness feature on the paper currency is not detected; and therefore, the region corresponding to the fine thickness feature is prevented from being misjudged as the change of the thickness, whether the thickness of the paper currency has changed is identified effectively, and the accuracy of detection on the paper currency is improved.

It should be noted that the steps shown in the flowchart of the accompanying drawings may be executed in, for example, a computer system including a set of computer executable instructions. In addition, although a logical sequence is shown in the flowchart, in some cases, the steps shown or described may be performed in an order different from here.

The embodiments of the present disclosure further provide an apparatus for detecting a thickness of paper. It should be noted that the apparatus for detecting the thickness of the paper in the embodiment may be used for executing the method for detecting the thickness of the paper in the embodiment of the present disclosure.

Figure 12:
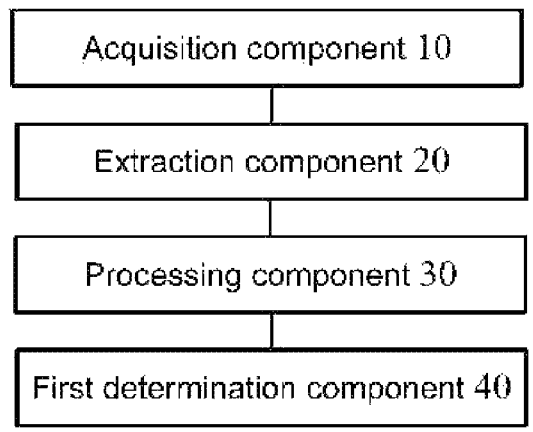
FIG. 12 is a schematic diagram of an apparatus for detecting a thickness of paper according to an embodiment of the present disclosure.

FIG. 12 is a schematic diagram of an apparatus for detecting a thickness of paper according to an embodiment of the present disclosure. As shown in FIG. 12, the apparatus includes: an acquisition component 10, an extraction component 20, a processing component 30 and a first determination component 40.

The acquisition component 10 is configured to acquire a first thickness image of a target paper.

The extraction component 20 is configured to extract at least one first thickness feature and at least one second thickness feature from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold.

The processing component 30 is configured to perform average processing on gray values of multiple pixel points in the at least one first thickness feature to acquire a first gray value, and to perform the average processing on gray values of a plurality of pixel points in the at least one second thickness feature to acquire a second gray value.

The first determination component 40 is configured to determine, when the first gray value is smaller than the second gray value of multiple pixel points in the at least one second thickness feature, that a thickness of a region, corresponding to the at least one second thickness feature, on the target paper has changed.

It should be noted that the acquisition component 10, the extraction component 20, the processing component 30 and the first determination component 40 may serve as one part of the apparatus to operate in a terminal, and functions implemented by the above components may be executed by a processor in the terminal. The terminal may also be a terminal device such as a smartphone (like an Android mobile phone, an iOS mobile phone, etc.), a tablet computer, a palm computer, Mobile Internet Devices (MID), a pad, etc.

Optionally, the apparatus further includes: a second determination component, configured to determine, when the first gray value is smaller than the second gray value of the multiple pixel points in the at least one second thickness feature, and when determining that the thickness of the region, corresponding to the at least one second thickness feature, on the target paper has changed, that a region, corresponding to the at least one first thickness feature, on the target paper has at least one crease feature or a random noise.

It should be noted that the second determination component may serve as one part of the apparatus to operate in the terminal, and functions implemented by the above components may be executed by the processor in the terminal.

Optionally, the apparatus further includes: a restoration component, configured to restore, after that the region, corresponding to the first thickness feature, on the target paper has the at least one crease feature or the random noise is determined, the gray values of the multiple pixel points in the at least one first thickness feature respectively into a target gray value of the target paper, wherein after the gray values of the multiple pixel points in the at least one first thickness feature is restored respectively into the target gray value of the target paper, the region corresponding to the at least one first thickness feature is unchanged in thickness, and does not have the at least one crease feature or the random noise; and a first acquisition component, configured to acquire a second thickness image of the target paper after the first gray value is restored into the target gray value, wherein the second thickness image is used for indicating that the region, corresponding to the at least one second thickness feature, on the target paper is changed in thickness.

It should be noted that the restoration component and the first acquisition component may serve as one part of the apparatus to operate in the terminal, and functions implemented by the above components may be executed by the processor in the terminal.

Optionally, the apparatus further includes: a third determination component, configured to determine that a second target threshold is used for determining that the first gray value is smaller than the second gray value.

It should be noted that the third determination component may serve as one part of the apparatus to operate in the terminal, and functions implemented by the above component may be executed by the processor in the terminal.

Optionally, the first determination component 40 includes: a determination module, configured to determine that the region, corresponding to the at least one second thickness feature, on the target paper is attached with at least one foreign object that makes the target paper be changed in thickness.

It should be noted that the determination module may serve as one part of the apparatus to operate in the terminal, and functions implemented by the above module may be executed by the processor in the terminal.

In the embodiment, the acquisition component 10 acquires the first thickness image of the target paper; the extraction component 20 extracts the at least one first thickness feature and the at least one second thickness feature from the first thickness image, wherein the number of pixel points of each of the at least one first thickness feature in the first thickness image is smaller than or equal to the first target threshold, and a number of pixel points of each of the at least one second thickness feature in the first thickness image is greater than the first target threshold; the processing component 30 performs the average processing on the gray values of the multiple pixel points in the at least one first thickness feature to acquire the first gray value, and to perform the average processing on gray values of a plurality of pixel points in the at least one second thickness feature to acquire the second gray value; and the first determination component 40 determines, when the first gray value is smaller than the second gray value of multiple pixel points in the at least one second thickness feature, that the thickness of the region, corresponding to the at least one second thickness feature, on the target paper has changed. The at least one first thickness feature and the at least one second thickness feature are extracted from the thickness image of the target paper, and when the first gray value after the gray values of the multiple pixel points in the at least one first thickness feature are averaged is smaller than the gray values for the pixel points in the second thickness feature, it is determined that the thickness of the region, corresponding to the second thickness feature, on the target paper has changed, so that the region corresponding to the first thickness feature is prevented from being misjudged as a change of the thickness, the change of the thickness of the paper is effectively detected, the problem of low accuracy of the detection on the thickness of the paper is solved, and the accurate effect of the detection on the thickness of the paper is achieved.

The embodiments of the present disclosure further provide a non-transitory storage medium. The non-transitory storage medium includes a stored program; and the program runs to control a device, where the storage medium is located, to execute the method for detecting the thickness of the paper in the embodiment of the present disclosure.

Each functional module provided by the embodiment of the present disclosure may run in the apparatus for detecting the thickness of the paper or a similar arithmetic apparatus, and may also serve as one part of the non-transitory storage medium for storage.

Optionally, in the embodiment, the non-transitory storage medium stores a computer program, on which at least one computer program is stored, the at least one computer program being executed by a processor to implement the method for detecting the thickness of the paper.

Figure 13:
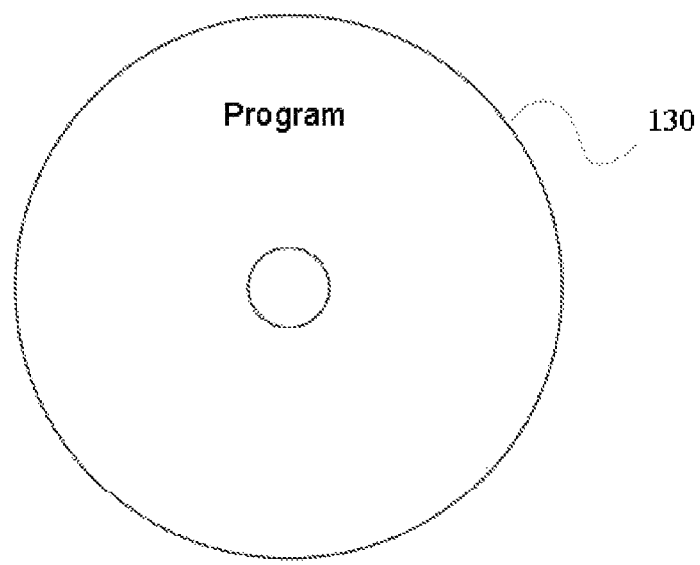
FIG. 13 is a structural schematic diagram of a storage medium according to an embodiment of the present disclosure.

FIG. 13 is a structural schematic diagram of a storage medium according to an embodiment of the present disclosure. As shown in FIG. 13, a program product 130 according to an implementation mode of the present disclosure is described; a computer program is stored on the program product 130; and the computer program is executed by a processor to implement a program code of the following steps.

A first thickness image of a target paper is acquired.

At least one first thickness feature and at least one second thickness feature are extracted from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold.

Average processing is performed on gray values of multiple pixel points in the at least one first thickness feature to acquire a first gray value, and the average processing is performed on gray values of the multiple pixel points in the at least one second thickness feature to acquire a second gray value.

When the first gray value is smaller than the second gray value of multiple pixel points in the at least one second thickness feature, it is determined that a thickness of a region, corresponding to the at least one second thickness feature, on the target paper has changed.

Optionally, the computer program is further executed by the processor to implement a program code of the following step.

When the first gray value is smaller than the second gray value of the multiple pixel points in the at least one second thickness feature, and when that the thickness of the region, corresponding to the at least one second thickness feature, on the target paper has changed is determined, it is determined that a region, corresponding to the at least one first thickness feature, on the target paper has at least one crease feature or a random noise.

Optionally, the computer program is further executed by the processor to implement a program code of the following steps.

After that the region, corresponding to the first thickness feature, on the target paper has the at least one crease feature or the random noise is determined, the gray values of the multiple pixel points in the at least one first thickness feature is restored respectively into a target gray value of the target paper, wherein after the gray values of the multiple pixel points in the at least one first thickness feature is restored respectively into the target gray value of the target paper, the region corresponding to the at least one first thickness feature is unchanged in thickness, and does not have the at least one crease feature or the random noise.

A second thickness image of the target paper after the first gray value is restored into the target gray value is acquired, wherein the second thickness image is used for indicating that the region, corresponding to the at least one second thickness feature, on the target paper is changed in thickness.

Optionally, the computer program is further executed by the processor to implement a program code of the following step.

It is determined that the region, corresponding to the at least one second thickness feature, on the target paper is attached with at least one foreign object that makes the target paper be changed in thickness.

Optionally, in the embodiment, the non-transitory storage medium may further be configured to determine a program code of steps of various preferred or optional methods provided by a region determination method.

Optionally, specific examples in the embodiment may be referred to the examples described in the above embodiments, and will not elaborated herein.

A computer non-transitory storage medium may be included in a baseband or serve as one part of transmitted data signal of a carrier, and carries a readable program code therein. Such a transmitted data signal may use multiple forms, including but not limited to an electromagnetic signal, an optical signal or any appropriate combination thereof. The computer non-transitory storage medium may send, spread or transmit a program that is used by an instruction execution system, device or component or combined with them for using.

The program code included in the computer non-transitory storage medium may use any appropriate medium for transmission, and includes but not limited to a wireless medium, a wired medium, an optical cable medium, a radio-frequency medium, and the like, or any appropriate combination thereof.

To achieve the above objective, according to another aspect of the present disclosure, the embodiments of the present disclosure further provide a processor.

Figure 14:
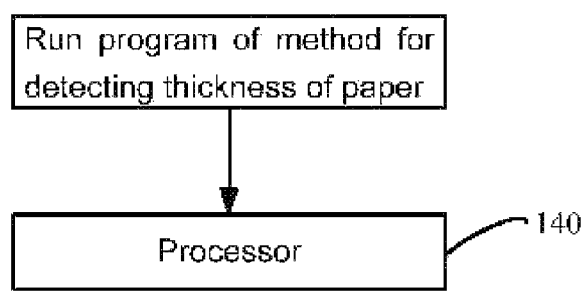
FIG. 14 is a structural schematic diagram of a processor according to an embodiment of the present disclosure.

FIG. 14 is a structural schematic diagram of a processor according to an embodiment of the present disclosure. As shown in FIG. 14, the processor 140 is configured to run a program; and the program runs to execute the method for detecting the thickness of the paper in the embodiment of the present disclosure.

In the embodiment of the present disclosure, the processor 140 may execute a run program of the method for detecting the thickness of the paper.

Optionally, in this embodiment, the processor 140 may be configured to execute the following steps.

A first thickness image of a target paper is acquired.

At least one first thickness feature and at least one second thickness feature are extracted from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold.

Average processing is performed on gray values of multiple pixel points in the at least one first thickness feature to acquire a first gray value, and the average processing is performed on gray values of the multiple pixel points in the at least one second thickness feature to acquire a second gray value.

When the first gray value is smaller than the second gray value of multiple pixel points in the at least one second thickness feature, it is determined that a thickness of a region, corresponding to the at least one second thickness feature, on the target paper has changed.

Optionally, the processor 140 may further be configured to execute the following step.

When the first gray value is smaller than the second gray value of the multiple pixel points in the at least one second thickness feature, and when that the thickness of the region, corresponding to the at least one second thickness feature, on the target paper has changed is determined, it is determined that a region, corresponding to the at least one first thickness feature, on the target paper has at least one crease feature or a random noise.

Optionally, the processor 140 may further be configured to execute the following steps.

After that the region, corresponding to the first thickness feature, on the target paper has the at least one crease feature or the random noise is determined, the gray values of the multiple pixel points in the at least one first thickness feature is restored respectively into a target gray value of the target paper, wherein after the gray values of the multiple pixel points in the at least one first thickness feature is restored respectively into the target gray value of the target paper, the region corresponding to the at least one first thickness feature is unchanged in thickness, and does not have the at least one crease feature or the random noise.

A second thickness image of the target paper after the first gray value is restored into the target gray value is acquired, wherein the second thickness image is used for indicating that the region, corresponding to the at least one second thickness feature, on the target paper is changed in thickness.

Optionally, the processor 140 may further be configured to execute the following step.

It is determined that the region, corresponding to the at least one second thickness feature, on the target paper is attached with at least one foreign object that makes the thickness of the target paper be changed in thickness.

The processor 140 may run the software program and module stored in the memory, thereby executing various functional applications and data processing, namely implementing the above-mentioned method for detecting the thickness of the paper.

Those of ordinary skill in the art may know that all or part of the steps of the methods in the above embodiments may be implemented by instructing related hardware of the apparatus for detecting a thickness of paper through a program, the program may be stored in a non-transitory storage medium of the apparatus for detecting a thickness of paper, and the non-transitory storage medium may include: a Read-Only Memory (ROM), a Random Access Memory (RAM), a magnetic disk or an optical disc.

The method and the apparatus for detecting a thickness of paper, the non-transitory storage medium and the processor of the present disclosure are described above in examples with reference to the accompanying drawings. However, the person skilled in the art should understand that various improvements may further be made on the region determination method and apparatus, the non-transitory storage medium and the processor of the present disclosure without departing from the content of the present disclosure. Therefore, the scope of protection of the present disclosure should only be limited by the content of the appended claims.

Obviously, the person skilled in the art should understand that the modules or steps of the present disclosure may be implemented by a general-purpose computing device and centralized in a single computing device or distributed over a network consisting of a plurality of computing devices. Optionally, they may be implemented by a program code executable by a computing device, so that they may be stored in a storage device and executed by the computing device. Moreover, they may be implemented by respectively fabricating them into respective integrated circuit modules or by fabricating a plurality of modules or steps of them into a single integrated circuit module. By doing so, the present disclosure is not limited to any specific combination of hardware and software.

The above are only preferred embodiments of the present disclosure and should not be used for limiting the present disclosure. For those skilled in the art, the present disclosure may have various modifications and has changed. Any modifications, equivalent replacements, improvements and the like within the spirit and principle of the present disclosure shall fall within the scope of protection of the present disclosure.

INDUSTRIAL APPLICABILITY

The first thickness image of the target paper is acquired; the at least one first thickness feature and the at least one second thickness feature are extracted from the first thickness image, wherein the number of pixel points of each of the at least one first thickness feature in the first thickness image is smaller than or equal to the first target threshold, and the number of pixel points of each of the at least one second thickness feature in the first thickness image is greater than the first target threshold; the average processing is performed on the gray values of the multiple pixel points in the at least one first thickness feature to acquire the first gray value; and when the first gray value is smaller than the second gray value of the multiple pixel points in the at least one second thickness feature, it is determined that the thickness of the region, corresponding to the at least one second thickness feature, on the target paper has changed. The at least one first thickness feature and the at least one second thickness feature are extracted from the thickness image of the target paper, and when the first gray value after the gray values of the multiple pixel points in the at least one first thickness feature are averaged is smaller than the gray values for the pixel points in the at least one second thickness feature, it is determined that the thickness of the region, corresponding to the second thickness feature, on the target paper has changed, so that the region corresponding to the first thickness feature is prevented from being misjudged as a change of the thickness, the change of the thickness of the paper is effectively detected, the problem of low accuracy of the detection on the thickness of the paper is solved, and the accurate effect of the detection on the thickness of the paper is achieved.

What is claimed is:

1. A method for detecting a thickness of paper, comprising:
   acquiring a first thickness image of a target paper;
   extracting at least one first thickness feature and at least one second thickness feature from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold;
   performing average processing on gray values of a plurality of pixel points in the at least one first thickness feature to acquire a first gray value, and performing the average processing on gray values of a plurality of pixel points in the at least one second thickness feature to acquire a second gray value; and
   when the first gray value is smaller than the second gray value of a plurality of pixel points in the at least one second thickness feature, determining that a thickness of a region, corresponding to the at least one second thickness feature, on the target paper has changed.

2. The method as claimed in claim 1, wherein when the first gray value is smaller than the second gray value of the plurality of pixel points in the at least one second thickness feature, and when determining that the thickness of the region, corresponding to the at least one second thickness feature, on the target paper has changed, the method further comprises:
   determining that a region, corresponding to the at least one first thickness feature, on the target paper has at least one crease feature or a random noise.

3. The method as claimed in claim 2, wherein after determining that the region, corresponding to the at least one first thickness feature, on the target paper has the at least one crease feature or the random noise, the method further comprises:
   restoring the gray values of the plurality of pixel points in the at least one first thickness feature respectively into a target gray value of the target paper, wherein after the gray values of the plurality of pixel points in the at least one first thickness feature is restored respectively into the target gray value of the target paper, the region corresponding to the at least one first thickness feature is unchanged in thickness, and does not have the at least one crease feature or the random noise; and
   acquiring a second thickness image of the target paper after the first gray value is restored into the target gray value, wherein the second thickness image is used for indicating that the region, corresponding to the at least one second thickness feature, on the target paper has changed in thickness.

4. The method as claimed in claim 3, wherein when performing the average processing on the gray values of the plurality of pixel points in the at least one first thickness feature to acquire the first gray value, the method further comprises:
   performing the average processing on gray values of a plurality of pixel points in the at least one second thickness feature to acquire the second gray value.

5. The method as claimed in claim 3, wherein determining that the thickness of the region, corresponding to the at least one second thickness feature, on the target paper has changed comprises:
   determining that the region, corresponding to the at least one second thickness feature, on the target paper is attached with a foreign object that makes the target paper be changed in thickness.

6. The method as claimed in claim 2, wherein when performing the average processing on the gray values of the plurality of pixel points in the at least one first thickness feature to acquire the first gray value, the method further comprises:
   performing the average processing on gray values of a plurality of pixel points in the at least one second thickness feature to acquire the second gray value.

7. The method as claimed in claim 2, wherein determining that the thickness of the region, corresponding to the at least one second thickness feature, on the target paper has changed comprises:
   determining that the region, corresponding to the at least one second thickness feature, on the target paper is attached with a foreign object that makes the target paper be changed in thickness.

8. The method as claimed in claim 1, wherein a second target threshold is used for determining that the first gray value is smaller than the second gray value.

9. The method as claimed in claim 8, wherein when performing the average processing on the gray values of the plurality of pixel points in the at least one first thickness feature to acquire the first gray value, the method further comprises:
   performing the average processing on gray values of plurality of pixel points in the at least one second thickness feature to acquire the second gray value.

10. The method as claimed in claim 8, wherein determining that the thickness of the region, corresponding to the at least one second thickness feature, on the target paper has changed comprises:
    determining that the region, corresponding to the at least one second thickness feature, on the target paper is attached with a foreign object that makes the target paper be changed in thickness.

11. The method as claimed in claim 1, wherein determining that the thickness of the region, corresponding to the at least one second thickness feature, on the target paper has changed comprises:
    determining that the region, corresponding to the at least one second thickness feature, on the target paper is attached with at least one foreign object that makes the target paper be changed in thickness.

12. An apparatus for detecting a thickness of paper, comprising at least one processor, and at least one memory for storing at least one program element, wherein the at least one program element is executed by the at least one processor, the at least one program element comprising:
    an acquisition component, configured to acquire a first thickness image of a target paper;
    an extraction component, configured to extract at least one first thickness feature and at least one second thickness feature from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold;

a processing component, configured to perform average processing on gray values of a plurality of pixel points in the at least one first thickness feature to acquire a first gray value, and performing the average processing on gray values of a plurality of pixel points in the at least one second thickness feature to acquire a second gray value; and a first determination component, configured to determine, when the first gray value is smaller than the second gray value of a plurality of pixel points in the at least one second thickness feature, that a thickness of a region, corresponding to the at least one second thickness feature, on the target paper has changed.

13. The apparatus as claimed in claim 12, wherein the apparatus further comprises:

a second determination component, configured to determine, when the first gray value is smaller than the second gray value of the plurality of pixel points in the at least one second thickness feature, and when determining that the thickness of the region, corresponding to the at least one second thickness feature, on the target paper has changed, that a region, corresponding to the at least one first thickness feature, on the target paper has at least one crease feature or a random noise.

14. A non-transitory storage medium, storing a computer program, on which at least one computer program is stored, the at least one computer program being executed by a processor to implement the following steps:

acquiring a first thickness image of a target paper;

extracting at least one first thickness feature and at least one second thickness feature from the first thickness image, wherein a number of pixel points of each of the at least one first thickness feature in the first thickness image is smaller than or equal to a first target threshold, and a number of pixel points of each of the at least one second thickness feature in the first thickness image is greater than the first target threshold;

performing average processing on gray values of a plurality of pixel points in the at least one first thickness feature to acquire a first gray value, and performing the average processing on gray values of a plurality of pixel points in the at least one second thickness feature to acquire a second gray value; and when the first gray value is smaller than the second gray value of a plurality of pixel points in the at least one second thickness feature, determining that a thickness of a region, corresponding to the at least one second thickness feature, on the target paper has changed.

* * * * *